(12) United States Patent
Wang et al.

(10) Patent No.: US 9,948,663 B1
(45) Date of Patent: Apr. 17, 2018

(54) SYSTEMS AND METHODS FOR PREDICTING SECURITY THREAT ATTACKS

(71) Applicant: Symantec Corporation, Mountain View, CA (US)

(72) Inventors: Yining Wang, Los Angeles, CA (US); Christopher Gates, Culver City, CA (US); Kevin Roundy, El Segundo, CA (US); Nikolaos Vasiloglou, Atlanta, GA (US)

(73) Assignee: Symantec Corporation, Mountain View, CA (US)

( * ) Notice: Subject to any disclaimer, the term of this patent is extended or adjusted under 35 U.S.C. 154(b) by 95 days.

(21) Appl. No.: 14/974,583

(22) Filed: Dec. 18, 2015

Related U.S. Application Data

(60) Provisional application No. 62/264,201, filed on Dec. 7, 2015.

(51) Int. Cl.
*H04L 29/06* (2006.01)
*G06F 17/30* (2006.01)

(52) U.S. Cl.
CPC .... *H04L 63/1416* (2013.01); *G06F 17/30091* (2013.01); *G06F 17/30598* (2013.01); *H04L 63/1433* (2013.01); *H04L 63/1441* (2013.01)

(58) Field of Classification Search
CPC ................ H04L 63/1416; H04L 63/1433
See application file for complete search history.

(56) References Cited

U.S. PATENT DOCUMENTS

| | | |
|---|---|---|
| 7,062,783 B1 | 6/2006 | Joiner |
| 7,073,198 B1 | 7/2006 | Flowers et al. |
| 7,808,897 B1 | 10/2010 | Mehta et al. |

(Continued)

OTHER PUBLICATIONS

Gemulla, R., Nijkamp, E., Haas, P.J. and Sismanis, Y., Aug. 2011. Large-scale matrix factorization with distributed stochastic gradient descent. InProceedings of the 17th ACM SIGKDD international conference on Knowledge discovery and data mining (pp. 69-77). ACM.*

(Continued)

*Primary Examiner* — James R Turchen
(74) *Attorney, Agent, or Firm* — FisherBroyles, LLP

(57) ABSTRACT

A computer-implemented method for predicting security threat attacks may include (1) identifying candidate security threat targets with latent attributes that describe features of the candidate security threat targets, (2) identifying historical attack data that describes which of the candidate security threat targets experienced an actual security threat attack, (3) determining a similarity relationship between latent attributes of at least one specific candidate security threat target and latent attributes of the candidate security threat targets that experienced an actual security threat attack according to the historical attack data, (4) predicting, based on the determined similarity relationship, that the specific candidate security threat target will experience a future security threat attack, and (5) performing at least one remedial action to protect the specific candidate security threat target in response to predicting the future security threat attack. Various other methods, systems, and computer-readable media are also disclosed.

20 Claims, 6 Drawing Sheets

(56) References Cited

U.S. PATENT DOCUMENTS

| | | | |
|---|---|---|---|
| 7,904,962 B1 | 3/2011 | Jajodia et al. | |
| 8,191,141 B2 | 5/2012 | Suit et al. | |
| 8,201,257 B1 | 6/2012 | Andres et al. | |
| 9,015,846 B2 | 4/2015 | Watters et al. | |
| 9,386,030 B2* | 7/2016 | Vashist | H04L 63/1416 |
| 9,396,332 B2* | 7/2016 | Abrams | G06F 21/554 |
| 9,525,697 B2* | 12/2016 | Woolward | G06F 21/552 |
| 2008/0262895 A1* | 10/2008 | Hofmeister | G06Q 10/04 705/7.17 |
| 2011/0178942 A1* | 7/2011 | Watters | G06Q 10/06 705/325 |
| 2014/0082730 A1* | 3/2014 | Vashist | H04L 63/1416 726/23 |
| 2015/0286825 A1* | 10/2015 | Freudiger | G06F 21/60 726/26 |
| 2015/0310215 A1* | 10/2015 | McBride | G06F 21/577 726/25 |
| 2016/0162690 A1* | 6/2016 | Reith | G06F 21/577 726/25 |
| 2016/0226893 A1* | 8/2016 | Warikoo | H04L 63/1416 |
| 2017/0006054 A1* | 1/2017 | Stiansen | H04L 63/1425 |
| 2017/0031565 A1* | 2/2017 | Chauhan | G06F 3/04842 |

OTHER PUBLICATIONS

Christopher Gates, et al; Systems and Methods for Predicting Security Threats; U.S. Appl. No. 15/055,653, filed Feb. 29, 2016.

Yining Wang, et al; Systems and Methods for Attack Prediction Based on Community Features; U.S. Appl. No. 62/264,201, filed Dec. 7, 2015.

Ivan Sanchez, et al., Towards Extracting Faithful and Descriptive Representations of Latent Variable Models, http://sameersingh.org/files/papers/knowlextr-krr15.pdf, (2015).

Sparse matrix, https://en.wikipedia.org/wiki/Sparse_matrix, as accessed Dec. 29, 2015, Wikipedia, (Dec. 30, 2003).

Albert Au Yeung, Matrix Factorization: A Simple Tutorial and Implementation in Python, http://www.quuxlabs.com/blog/2010/09/matrix-factorization-a-simple-tutorial-and-implementation-in-python/, as accessed Dec. 29, 2015, (Sep. 16, 2010).

Dheeraj kumar Bokde, et al., Role of Matrix Factorization Model in Collaborative Filtering Algorithm: A Survey, https://arxiv.org/ftp/arxiv/papers/1503/1503.07475.pdf, International Journal of Advance Foundation and Research in Computer (IJAFRC) vol. 1, Issue 6, (May 2014).

Yehuda Koren, et al, Matriz Factorizattion Techniques for Recommender Systems, http://www.columbia.edu/~jwp2128/Teaching/W4721/papersheeecomputer.pdf, Computer, vol. 42, Issue 8, IEEE Computer Society, (Aug. 2009).

Chapter 9—Recommendation Systems, http://infolab.stanford.edu/~ullman/mmds/ch9.pdf, (Dec. 16, 2010).

* cited by examiner

SYSTEMS AND METHODS FOR PREDICTING SECURITY THREAT ATTACKS

CROSS REFERENCE TO RELATED APPLICATION

This application claims the benefit of U.S. Provisional Application No. 62/264,201, filed 7 Dec. 2015, the disclosure of which is incorporated, in its entirety, by this reference.

BACKGROUND

Individuals and organizations typically seek to protect their computing resources from sophisticated security threats. Nevertheless, most computing security products focus on addressing attacks after the attacks have occurred. For example, an antivirus program product may block a computer virus after detecting that the computer virus is active on a client computing system. Similarly, a firewall program product may block malicious network traffic upon detecting the traffic attempting to reach a client computing system.

Although these computing security products provide a level of protection against corresponding security threats, the products may fail to optimally protect an enterprise's computing resources. For example, these computing security products may fail to predict or anticipate attacks on the enterprise's computing resources. Consequently, the computing security products may fail to take preventive measures that would better protect the enterprise from future or predicted attacks. Accordingly, the instant disclosure identifies and addresses a need for additional and improved systems and methods for predicting security threat attacks.

SUMMARY

As will be described in greater detail below, the instant disclosure generally relates to systems and methods for predicting security threat attacks by, for example, mathematically analyzing a matrix having enterprise organizations listed along the rows and types of malware attacks listed along the columns, as discussed further below. In one example, a computer-implemented method for predicting security threat attacks may include (1) identifying candidate security threat targets with latent attributes that describe features of the candidate security threat targets, (2) identifying historical attack data that describes which of the candidate security threat targets experienced an actual security threat attack, (3) determining, by a software security prediction program, a similarity relationship between latent attributes of at least one specific candidate security threat target and latent attributes of the candidate security threat targets that experienced an actual security threat attack according to the historical attack data, (4) predicting, by the software security prediction program based on the determined similarity relationship, that the specific candidate security threat target will experience a future security threat attack, and (5) performing, by the software security prediction program, at least one remedial action to protect the specific candidate security threat target in response to predicting the future security threat attack.

In one embodiment, the candidate security threat targets include enterprise organizations. In further embodiments, the enterprise organizations include customers of a vendor of the software security prediction program.

In one embodiment, determining the similarity relationship may include (1) identifying an additional candidate security threat target that experienced a pair of actual security threat attacks and (2) determining that the specific candidate security threat target experienced one of the pair of actual security threat attacks. In these embodiments, predicting that the specific candidate security threat target will experience the future security threat attack may include predicting that the specific candidate security threat target will experience the other of the pair of actual security threat attacks. In some examples, determining the similarity relationship may include: (1) identifying an additional candidate security threat target that stored a cluster of benign files and that experienced a same security threat attack as the predicted future security threat attack and (2) determining that the specific candidate security threat target also stored the cluster of benign files.

In some examples, determining the similarity relationship may include analyzing a matrix that identifies (1) enterprise organizations corresponding to at least one of rows and columns of the matrix and (2) security threat attacks corresponding to the other of the rows and columns of the matrix. In further embodiments, the matrix may include a sparse matrix. In some examples, determining the similarity relationship may include performing a rank factorization of the matrix. In further examples, performing the rank factorization of the matrix may include executing a stochastic gradient descent algorithm.

In one embodiment, determining the similarity relationship may include (1) ranking candidate security threat targets in terms of counts of experiencing actual security threat attacks and (2) ranking security threat attacks in terms of actually attacking enterprise organizations. In these examples, predicting that the specific candidate security threat target will experience the future security threat attack is based on the rank of the specific candidate security threat target and the rank of the predicted future security threat attack.

In one embodiment, a system for implementing the above-described method may include (1) an identification module, stored in memory, that identifies candidate security threat targets with latent attributes that describe features of the candidate security threat targets and that identifies historical attack data that describes which of the candidate security threat targets experienced an actual security threat attack, (2) a determination module, stored in memory, that determines, as part of a software security prediction program, a similarity relationship between latent attributes of at least one specific candidate security threat target and latent attributes of the candidate security threat targets that experienced an actual security threat attack according to the historical attack data, (3) a prediction module, stored in memory, that predicts, as part of the software security prediction program based on the determined similarity relationship, that the specific candidate security threat target will experience a future security threat attack, (4) a performance module, stored in memory, that performs, as part of the software security prediction program, at least one remedial action to protect the specific candidate security threat target in response to predicting the future security threat attack, and (5) at least one physical processor configured to execute the identification module, the determination module, the prediction module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify candidate security threat targets with latent attributes that describe features of the candidate security threat targets, (2) identify historical attack data that describes which of the candidate security threat targets experienced an actual security threat attack, (3) determine, by a software security prediction program, a similarity relationship between latent attributes of at least one specific candidate security threat target and latent attributes of the candidate security threat targets that experienced an actual security threat attack according to the historical attack data, (4) predict, by the software security prediction program based on the determined similarity relationship, that the specific candidate security threat target will experience a future security threat attack, and (5) perform, by the software security prediction program, at least one remedial action to protect the specific candidate security threat target in response to predicting the future security threat attack.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
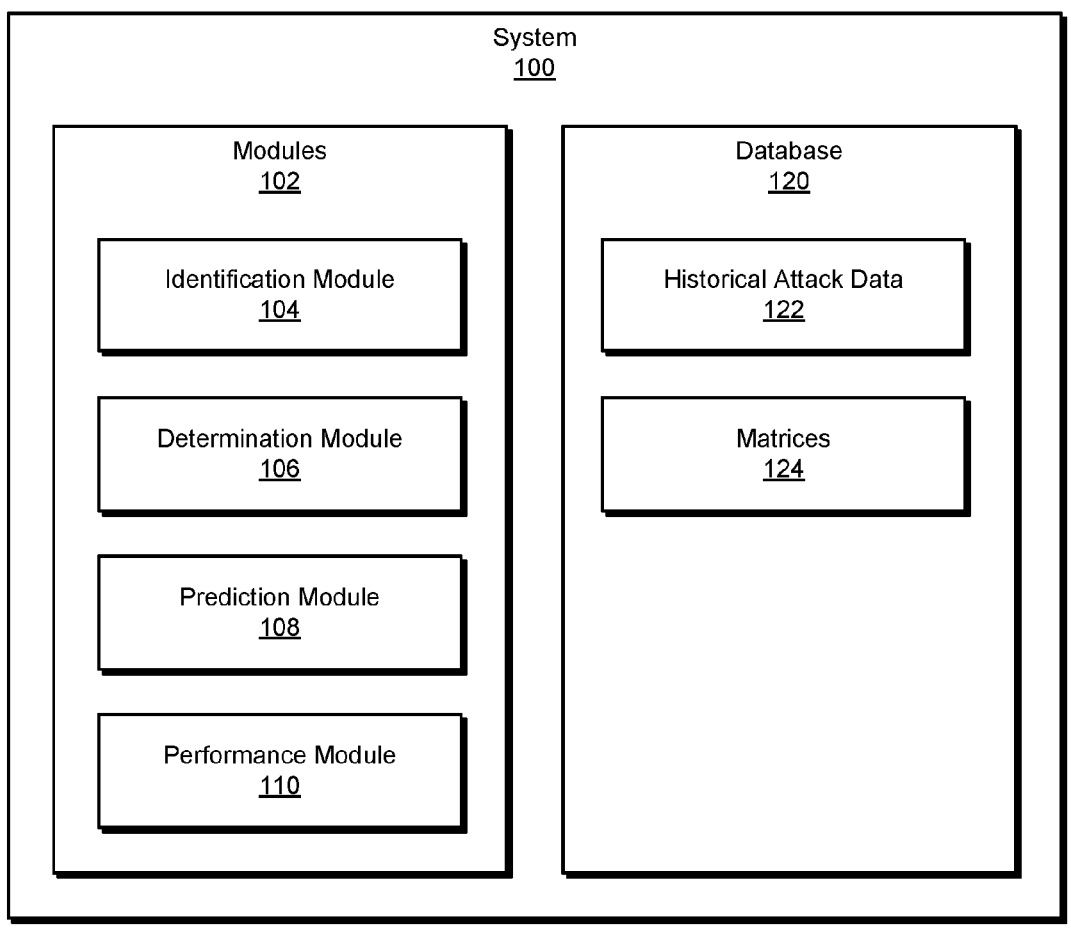
FIG. 1 is a block diagram of an exemplary system for predicting security threat attacks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for predicting security threat attacks. As will be explained in greater detail below, the disclosed systems and methods may enable and/or improve the prediction of security threat attacks by newly applying one or more algorithms to historical attack data that describes histories of attacks on various security targets, such as enterprise organizations. For example, the disclosed systems and methods may apply a collaborative filtering algorithm to improve predictions of security threat attacks, thereby enabling predicted targets to take preventive action prior to the attacks occurring.

Figure 2:
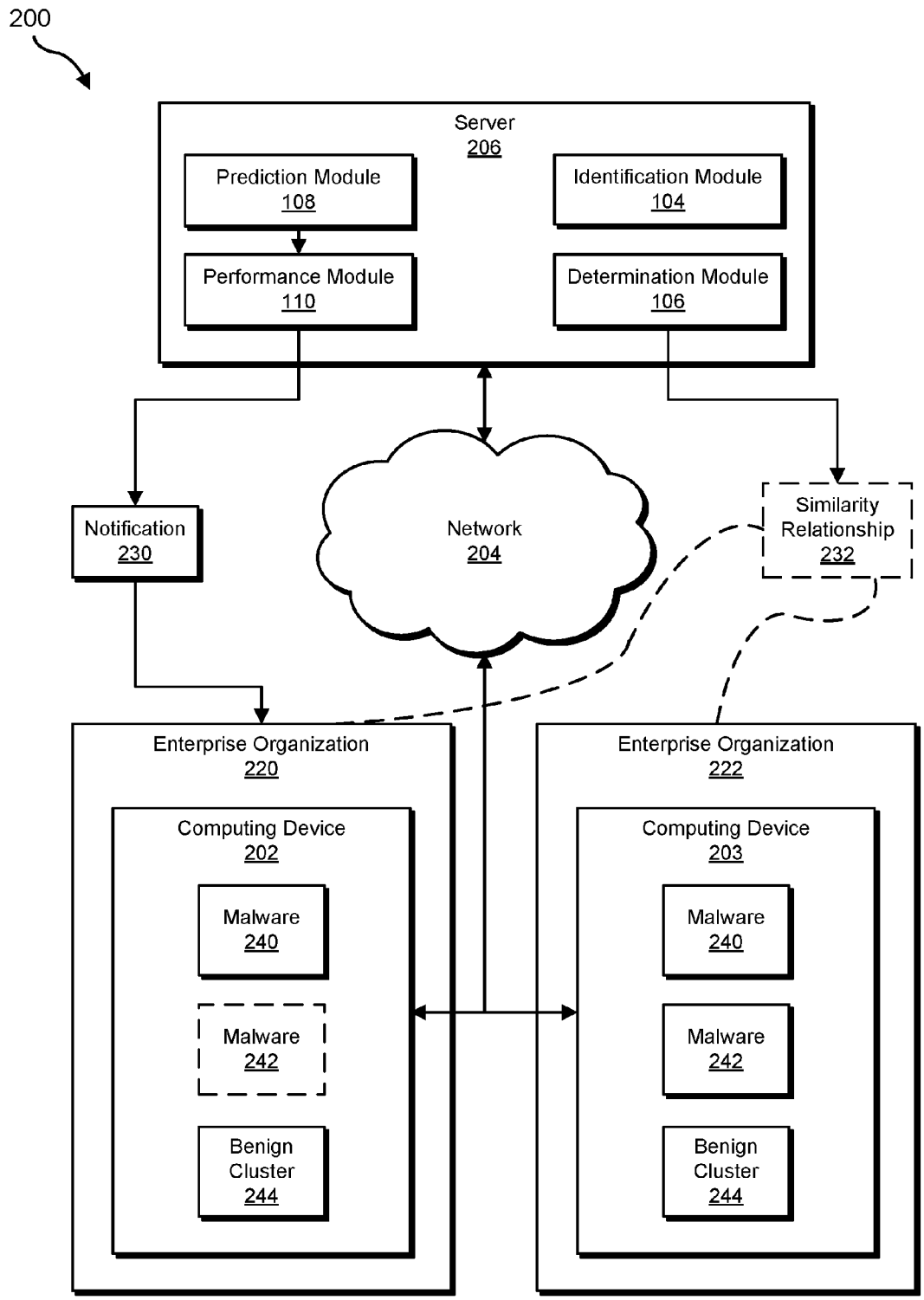
FIG. 2 is a block diagram of an additional exemplary system for predicting security threat attacks.

The following will provide, with reference to FIGS. 1-2, detailed descriptions of exemplary systems for predicting security threat attacks. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of exemplary system 100 for predicting security threat attacks. As illustrated in this figure, exemplary system 100 may include one or more modules 102 for performing one or more tasks. For example, and as will be explained in greater detail below, exemplary system 100 may also include an identification module 104 that may identify candidate security threat targets with latent attributes that describe features of the candidate security threat targets. Identification module 104 may also identify historical attack data that describes which of the candidate security threat targets experienced an actual security threat attack.

Additionally, exemplary system 100 may include a determination module 106 that may determine, as part of a software security prediction program, a similarity relationship between latent attributes of at least one specific candidate security threat target and latent attributes of the candidate security threat targets that experienced an actual security threat attack according to the historical attack data. Exemplary system 100 may also include a prediction module 108 that may predict, as part of the software security prediction program based on the determined similarity relationship, that the specific candidate security threat target will experience a future security threat attack.

Exemplary system 100 may additionally include a performance module 110 that may perform, as part of the software security prediction program, at least one remedial action to protect the specific candidate security threat target in response to predicting the future security threat attack. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store historical attack data 122, which may indicate information about candidate security threat targets, such as enterprise organizations, and security threat attacks, such as malware attacks, that actually occurred. For example, historical attack data 122 may identify the enterprise organization, the instance or type of malware attack, the timing of the malware attack or detection, and/or any other associated metadata that describes the enterprise organization or the associated malware. Database 120 may also be configured to store matrices 124, which may map security threat targets to corresponding security threat attacks, as discussed further below in connection with FIG. 4.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to predict security threat attacks. For example, and as will be described in greater detail below, identification module 104 may identify candidate security threat targets, such as an enterprise organization 220 and an enterprise organization 222, with latent attributes that describe features of the candidate security threat targets. Identification module 104 may also identify historical attack data, such as historical attack data 122, that describes which of the candidate security threat targets experienced an actual security threat attack. In the example of this figure, a computing device 203 (which may parallel computing device 202) within enterprise organization 222 previously detected a malware 240 and a malware 242. Similarly, computing device 202 within enterprise organization 220 previously detected malware 240 but has not yet detected the presence of malware 242 (as indicated by the dashed lines).

Determination module 106 may determine, as part of a software security prediction program or system, a similarity relationship 232 between latent attributes of at least one specific candidate security threat target (e.g., enterprise organization 220) and latent attributes of the candidate security threat targets (e.g., including enterprise organization 222) that experienced an actual security threat attack according to the historical attack data. For example, enterprise organization 222 experienced actual attacks associated with malware 240 and malware 242.

Prediction module 108 may predict, as part of the software security prediction program or system based on determined similarity relationship 232, that enterprise organization 220 will experience a future security threat attack. In this specific example, prediction module 108 may predict that enterprise organization 220 will experience a future security threat attack associated with malware 242, which is not yet detected at enterprise organization 220. Accordingly, performance module 110 may perform, as part of the software security prediction program or system, at least one remedial action to protect enterprise organization 220 in response to predicting the future security threat attack. For example, performance module 110 may issue a notification 230 to enterprise organization 220 to notify or warn enterprise organization 220 about the predicted future attack. Notably, FIG. 2 also illustrates how enterprise organization 220 and enterprise organization 222 both stored a benign cluster 244 of files, as discussed below regarding step 306 in connection with FIG. 3.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of facilitating the prediction of security threat attacks, as discussed below. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
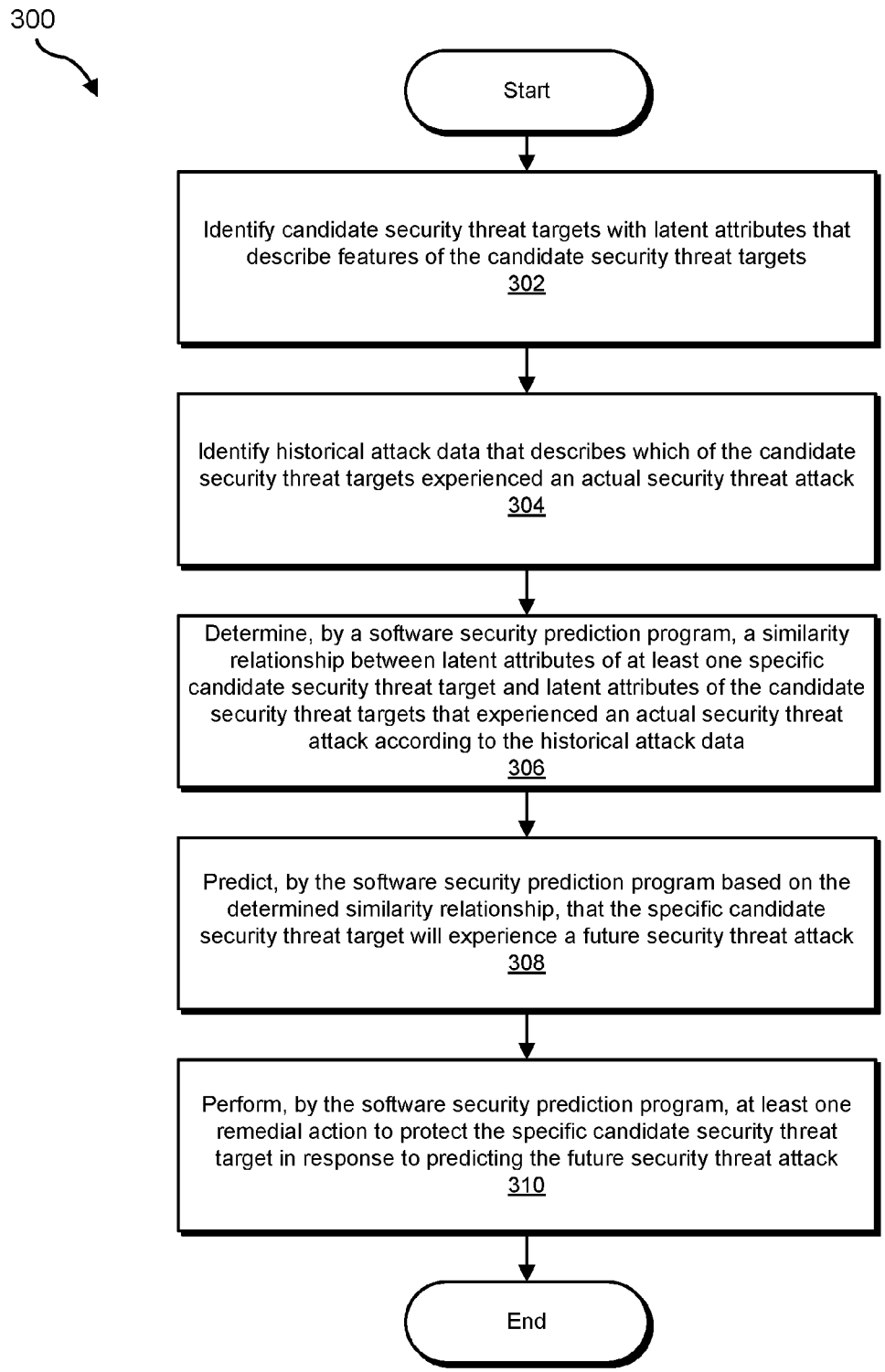
FIG. 3 is a flow diagram of an exemplary method for predicting security threat attacks.

FIG. 3 is a flow diagram of an exemplary computer-implemented method 300 for predicting security threat attacks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may identify candidate security threat targets with latent attributes that describe features of the candidate security threat targets. For example, identification module 104 may, as part of server 206 in FIG. 2, identify enterprise organization 220 and enterprise organization 222 with latent attributes that describe features of these organizations.

As used herein, the term "candidate security threat target" generally refers to any entity that may be targets for computer-based security attacks, such as malware attacks. Examples of candidate security threat targets include computing systems, computing devices, network devices, enterprise organizations, legal entities, organizations, businesses, individuals, product lines, financial assets or accounts, and/or any permutation of these, etc. Moreover, candidate security threat targets may be grouped together for analysis, such as a set of candidate security threat targets that share a specific attribute, type, model number, product line, characteristic, etc. Moreover, as used herein, the term "latent attributes" generally refers to any attribute of a candidate security threat target that a security or prediction analysis may ascertain as relevant to predicting future security threat attacks, as discussed further below. In some examples, latent attributes may simply refer to data indicating historical security threat attacks and/or a pattern or timing of security threat attacks. In other examples, latent attributes may be revealed through a collaborative filtering and/or matrix factorization analysis, as discussed further below in connection with FIG. 4.

Identification module 104 may identify the candidate security threat targets in a variety of ways. In one embodiment, the candidate security threat targets include enterprise organizations, such as enterprise organization 220 and enterprise organization 222. In further examples, the enterprise organizations include customers of a vendor of the software security prediction program, which may correspond to system 200 and/or server 206. In other words, enterprise customers of a software security vendor may purchase predictive analysis to predict whether the customers will become targets of future attacks. Accordingly, the software security vendor may collect or obtain historical attack data 122 that indicates previously detected attacks directed to the customers and/or directed to other targets. A backend security server, such as server 206, may analyze historical attack data 122 to predict which of the customers will become targets of actual attacks and also optionally predict the identity, timing, and/or nature of the attacks, as discussed further below.

In general, identification module 104 may identify the candidate security threat targets in response to a request to purchase a prediction analysis that predicts whether and/or how the candidate security threat targets will become actual targets of future attacks. Identification module 104 may also identify the candidate security threat targets in any other suitable manner, such as by analyzing publicly available data and/or as part of providing complementary or trial-based security services.

Moreover, to reduce the size of the data set and/or corresponding matrix, identification module 104 may aggregate targets into groups of targets. For example, identification module 104 may aggregate client devices or machines into groups of client devices or into corresponding enterprise organizations. Similarly, identification module 104 may aggregate malware samples into malware families (e.g., as determined by a malware index/database or software security product provided by a software security vendor) or into even broader categories of threats, such as adware, trojans, targeted attacks, etc.

At step 304, one or more of the systems described herein may identify historical attack data that describes which of the candidate security threat targets experienced an actual security threat attack. For example, identification module 104 may, as part of server 206 in FIG. 2, identify historical attack data 122 that describes which of enterprise organization 220 and enterprise organization 222 (e.g., among other enterprise organizations) experienced an actual security threat attack.

Identification module 104 may identify the historical attack data in a variety of ways. As discussed above, identification module 104 may identify the historical attack data as part of a purchase agreement for purchasing prediction services, as outlined above. In other words, a customer of a software security vendor may provide historical attack data as part of the purchase agreement to enable the software security vendor to perform the prediction analysis. Additionally, or alternatively, the software security vendor may have obtained historical attack data prior to the purchase agreement. For example, the software security vendor may have obtained historical attack data through a previous purchase of a different security product or service, such as antivirus or intrusion prevention products. Similarly, the software security vendor may have obtained historical attack data through complementary or trial-based services, such as a free antivirus program. In general, one or more software security products, such as antivirus programs, may be freely available and widely in use, and these software security products may broadly collect telemetry data on historical attacks at corresponding client devices and associated enterprise organizations.

At step 306, one or more of the systems described herein may determine, as part of a software security prediction program, a similarity relationship between latent attributes of at least one specific candidate security threat target and latent attributes of the candidate security threat targets that experienced an actual security threat attack according to the historical attack data. For example, determination module 106 may, as part of server 206 in FIG. 2, determine a similarity relationship between latent attributes of enterprise organization 220 and latent attributes of other enterprise organizations (e.g., including enterprise organization 222) that experienced an actual security threat attack according to historical attack data 122.

As used herein, the term "similarity relationship" generally refers to any relationship, mathematical formula, result of a mathematical formula, and/or measured association that enables a prediction service or product to predict a future attack on one entity based on analysis of data indicating corresponding attacks on other or related entities. In some examples, the similarity relationship indicates that the candidate security threat targets share one or more attributes, which may have predictive power according to the prediction analysis, as discussed further below. In other examples, the similarity relationship may simply correspond to a matrix factorization that generates two matrices enabling a prediction service or product to predict a future security attack based on an analysis of previous attacks on other or related entities.

Determination module 106 may determine the similarity relationship in a variety of ways. In one embodiment, determination module 106 may determine the similarity relationship by (1) identifying an additional candidate security threat target that experienced a pair of actual security threat attacks and (2) determining that the specific candidate security threat target experienced one of the pair of actual security threat attacks. In the example of FIG. 2, determination module 106 may identify enterprise organization 222 that experienced the pair of actual security threat attacks corresponding to malware 240 and malware 242. Determination module 106 may also determine that enterprise organization 220 experienced one of the pair of these security threat attacks (i.e., experienced malware 240). Accordingly, prediction module 108 may predict that the specific candidate security threat target (e.g., enterprise organization 220) will experience a future security threat attack (i.e., malware 242) based on this analysis. In this simplified example, prediction module 108 may predict the future malware attack for malware 242 based simply on the analysis of historical attacks on enterprise organization 222. Nevertheless, in other examples, prediction module 108 may predict the future malware attack form malware 242 at enterprise organization 220 based on an analysis of multiple numerous other enterprise organizations. For example, determination module 106 may determine that a threshold number of other enterprise organizations experienced both malware 240 and malware 242 and/or experienced malware 242 after previously experiencing malware 240 (e.g., as determined by detecting a download, installation, presence, and/or activity associated with the corresponding malware).

In some examples, determination module 106 may determine the similarity relationship by identifying an additional candidate security threat target that stored a cluster of benign files and that experienced a same security threat attack as the predicted future security threat attack. For example, determination module 106 may identify enterprise organization 222 that stored benign cluster 244 and that experienced malware 240, which enterprise organization 220 also experienced, as discussed above. In these examples, determination module 106 may further determine that the specific candidate security threat target also stored the cluster of benign files. More specifically, determination module 106 may further determine that enterprise organization 220 also stored benign cluster 244. The fact that both enterprise organization 220 and enterprise organization 222 both stored benign cluster 244 may constitute a similarity relationship according to which prediction module 108 may predict that enterprise organization 220 will also experience malware 242. In other words, prediction module 108 may base the prediction on an estimated likelihood that organizations that store similar files or clusters of files will also be correspondingly more likely to experience the same or similar security threat attacks.

Figure 4:
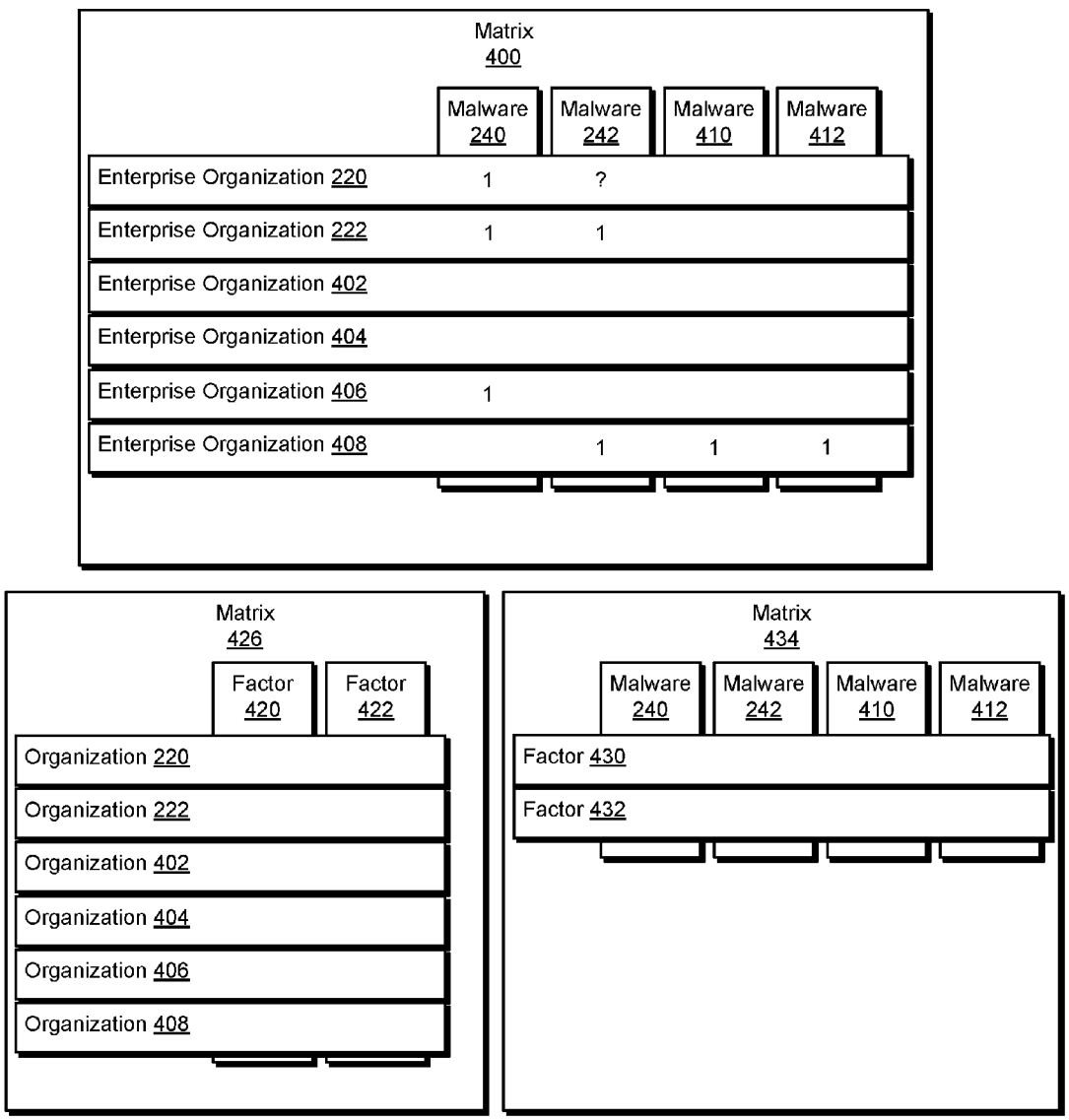
FIG. 4 is a block diagram of an exemplary matrix referenced by exemplary methods and systems for predicting security threat attacks.

In further examples, determination module 106 may determine the similarity relationship by analyzing a matrix that identifies (1) enterprise organizations corresponding to at least one of rows and columns of the matrix and (2) security threat attacks corresponding to the other of the rows and columns of the matrix. FIG. 4 shows an example of such a matrix, matrix 400. As shown in this figure, matrix 400 may identify enterprise organization 220, enterprise organization 222, an enterprise organization 402, an enterprise organization 404, an enterprise organization 406, and an enterprise organization 408 corresponding to rows. Similarly, matrix 400 may identify malware 240, malware 242, a malware 410, and a malware 412 corresponding to columns. Matrix 400 further shows that enterprise organization 220 detected malware 240 and that enterprise organization 222 detected malware 240 and malware 242, as discussed above in connection with FIG. 2. Matrix 400 also shows other detected malware at other specified enterprise organizations. Notably, matrix 400 also includes a question mark at the intersection of enterprise organization 220 and malware 242, indicating that malware 242 has not yet been detected at enterprise organization 220, yet prediction module 108 may predict that enterprise organization 220 will detect the corresponding attack in the future (e.g., in the absence of remedial or preventive measures to prevent the attack).

In one embodiment, the matrix may include a sparse matrix, such as a sparse binary matrix. For example, matrix 400 includes mostly zeros or blank space, with a relatively small proportion of the matrix entries including a "1" to indicate a known or detected previous malware attack. Notably, although the enterprise organizations correspond to rows and the malware instances correspond to columns in FIG. 4, the disclosed systems and methods may also analyze matrices that reverse this orientation (e.g., the corresponding mathematical operations are appropriately symmetrical).

In further examples, determination module 106 may determine the similarity relationship by performing a rank factorization (e.g., a low rank factorization or collaborative filtering computation) of the matrix. For example, determination module 106 may factor matrix 400 into a matrix 426 and a matrix 434, as further shown in FIG. 4. Notably, matrix 426 may include a same number of rows as matrix 400, which corresponds to the same six enterprise organizations. Similarly, matrix 434 may include a same number of columns as matrix 400, which corresponds to the same four malware instances, types, families, and/or identifiers.

Furthermore, matrix 426 may indicate a factor 420 and a factor 422 as columns, whereas matrix 434 may indicate a factor 430 and a factor 432 as rows. Each of these factors may simply correspond to a type or grouping of numerical values (e.g., numerical values along the columns in matrix 426 and along the rows in matrix 434) that, when multiplied according to matrix or vector multiplication, produce the same or approximately the same values shown in matrix 400. Notably, although matrix 400 includes mostly blank space, multiplying corresponding vectors from matrix 426 and matrix 434 may produce values for each entry within matrix 400, thereby filling the blank space by predicting values indicating whether the corresponding enterprise organization and malware (as indicated by an intersection at matrix 400) will experience a future security threat attack.

In the example of FIG. 4, the matrix factorization may result in two matrices that reproduce the same or approximately the same matrix 400 based on two latent factors at each of matrix 426 and matrix 434. Detecting the numerical values for the latent factors for each enterprise organization and for each malware instance will thereby create or generate a short real vector as the latent representation of the respective enterprise organization and/or malware instance. Moreover, prediction module 108 may generate a prediction for each pair of enterprise organization and malware instance by computing the inner product of their latent representation vectors.

Nevertheless, the number of factors at each factored matrix may be a matter of design choice (although the number of factors must generally be the same between the two factored matrices, such as the two factors at each of matrix 426 and matrix 434, according to matrix factorization). A smaller number of factors may produce less accuracy in reproducing matrix 400 but may be fast and/or computationally inexpensive. In contrast, a larger number of factors may produce more accuracy in reproducing matrix 400 but maybe slower and/or computationally more expensive and intractable. In some examples, determination module 106 may factor matrix 400 a multitude of times, each time testing to determine a number of factors that results in an appropriate balance between accuracy in reproducing matrix 400 and computational efficiency or tractability (e.g., according to a predefined formula or threshold indicating an appropriate balance or trade-off).

In further examples, to address challenges with computational intractability (e.g., with sufficiently large matrices and/or data sets), determination module 106 may perform the matrix factorization at least in part by executing a stochastic gradient descent algorithm. For example, determination module 106 may randomly sample entries or areas of matrix 400 and solve one or more surrounding entries or areas according to a stochastic gradient descent algorithm, thereby enabling the matrix factorization to more efficiently factor matrix 400 and thereby improve the computational tractability of the matrix factorization.

More specifically, determination module 106 may execute the stochastic gradient descent algorithm in parallel using parallel computer processing, thereby shortening the computing time of the entire system. In these examples, each iteration of the stochastic gradient descent algorithm picks a random observed matrix entry and another number (e.g., ten to twenty) of unobserved matrix entries as a small subset of the training data. Determination module 106 may then compute gradients on the subsample and then determination module 106 may update model parameters using regular gradient descent. Since the data matrix is extremely sparse, determination module 106 may significantly down-weight each negative unobserved matrix entry to compensate for the sparseness of observed matrix entries. In other examples, determination module 106 may address challenges with computational intractability in part by performing the matrix factorization according to an alternating least-squares algorithm.

In further examples, determination module 106 may determine the similarity relationship by (1) ranking candidate security threat targets in terms of counts of experiencing actual security threat attacks and (2) ranking security threat attacks in terms of actually attacking enterprise organizations. For example, determination module 106 may rank one or more enterprise organizations in terms of counts of experiencing actual security threat attacks. In the example of FIG. 4, enterprise organization 408 is ranked first because enterprise organization 408 experienced three different malware attacks, which is more than the other enterprise organizations. Similarly, malware 240 is ranked first because malware 240 attacked three separate enterprise organizations, which is more than the other malware instances.

In view of the above, determination module 106 may determine the similarity relationship in part by predicting that malware 240, as the most aggressive or popular malware, will attack enterprise organization 408, as the most vulnerable enterprise organization (e.g., determine that enterprise organization 408 has a similarity relationship with the other enterprise organizations that experienced malware 240). Determination module 106 may similarly determine similarity relationships for other enterprise organizations going down the ranks of the most popular malware and/or the most vulnerable enterprise organizations, thereby enabling prediction module 108 to predict future attacks up to a predefined cutoff or threshold in terms of malware and/or enterprise rank. In other words, prediction module 108 may predict that the specific candidate security threat target will experience a future security threat attack based on the rank of the specific candidate security threat target and/or the rank of the predicted future security threat attack.

At step 308, one or more of the systems described herein may predict, as part of the software security prediction program based on the determined similarity relationship, that the specific candidate security threat target will experience a future security threat attack. For example, prediction module 108 may, as part of server 206 in FIG. 2, predict, based on the determined similarity relationship, that the specific candidate security threat target will experience a future security threat attack.

Prediction module 108 may predict the future security threat attack in a variety of ways. In general, prediction module 108 may predict the future security threat attack in accordance with any of the prediction analyses and/or similarity relationship determinations outlined above in connection with step 306 of method 300. In other words, prediction module 108 may predict the future security threat attack using any suitable recommendations system, content filtering recommendation system, collaborative filtering recommendation system, neighborhood method, latent factor model, matrix factorization, low rank matrix factorization, stochastic gradient descent algorithm, and/or alternating least-squares algorithm, as outlined above, to recommend predicted future attacks for candidate targets based on an analysis of historical data for previous attacks on one or more other targets.

In other words, the disclosed systems and methods may leverage and reengineer recommendation systems, such as recommendation systems used to recommend movies, music, and/or products (e.g., recommendation systems used by NETFLIX and/or AMAZON) to recommend predictions for future malware or other security attacks instead of recommending media content or products. For example, media vendors such as NETFLIX apply a friend-of-a-friend algorithm to recommend media content to one friend based on a determination that a friend of the friend also liked the media content. Accordingly, by analogy, the disclosed systems and methods may predict a future security threat attack for one candidate target based on a determination that the candidate target has a similarity relationship (e.g., shares one or more attributes, as discussed above in connection with FIGS. 2 and 4) with a previous actual target of the same or related security threat attack.

In the example of FIG. 4, prediction module 108 may predict the future security threat attack by determining that a previously unknown or blank entry for matrix 400, when populated by multiplying matrix 426 and matrix 434 (e.g., by multiplying a vector of matrix 426 by a corresponding vector of matrix 434), receives a value that satisfies a predetermined threshold or metric indicating a predicted future attack (e.g., a value that satisfies a predetermined threshold or metric indicating sufficient nearness to the value "1" for other previously detected attacks). In other examples, the previously unknown or blank entry for matrix 400 may be populated by the exact value of "1" when a corresponding attack is predicted. In this manner, prediction module 108 may attempt to partially or entirely complete matrix 400, thereby predicting future attacks based on data indicating previous attacks.

Moreover, in completing matrix 400, prediction module 108 may also incorporate, or factor in, side information, such as software packages installed on testing machines and virus categories reported by a software security vendor for malicious executables, thereby improving prediction accuracy. For example, prediction module 108 may retrieve file clusters on enterprise machines as well as categories and file names of malicious executable files by querying a software security vendor database. Prediction module 108 may then construct feature vectors for each enterprise and malicious file instance. The feature vectors provide more details of each row and column of the incomplete data matrix. Accordingly, the feature vectors may help predict potential attacks for those enterprises whose previous attack history is limited. Mathematically, prediction module 108 may incorporate side information (e.g., feature vectors) into the prediction by augmenting the conventional low-rank collaborative filtering model with an additional low rank predicting matrix.

In one specific example, suppose x and y are feature vectors of a specific (enterprise, malware) pair. The proposed algorithm fits a low-dimensional prediction matrix A and defines the prediction score of a given enterprise-malware pair by computing the bi-linear form between the fitted prediction matrix A and the feature vectors x and y. Finally, prediction module 108 may combine predictions obtained by side information with predictions made by collaborative filtering to make final recommendations through performance module 110, as discussed further below. More generally, prediction module 108 and/or determination module 106 may attempt to ascertain the attributes that make a candidate target normal, or more normal according to a statistical or mathematical analysis, and then find correlations between that measured level of normalcy and susceptibility to specific security threat attacks.

At step 310, one or more of the systems described herein may perform, as part of the software security prediction program, at least one remedial action to protect the specific candidate security threat target in response to predicting the future security threat attack. For example, performance module 110 may, as part of server 206 in FIG. 2, perform at least one remedial action to protect enterprise organization 220 in response to predicting the future security threat attack.

As used herein, the term "remedial action" generally refers to any action that an autonomous, semi-autonomous, automated, and/or manually operated software security prediction program may take to help protect a candidate security threat target. Examples of the remedial action may include notifying the predicted target, notifying a user and/or administrator (e.g., notifying one or more individuals of any information about the attack, including an identity, nature, timing, and/or recommended protective action associated with the attack), prompting the user and/or administrator to take one or more additional remedial actions, and/or enabling, strengthening, and/or heightening one or more security measures. The security measures may include antivirus, intrusion prevention system, firewall, virtual private networking, sandboxing, quarantining, virtualization, and/or data loss prevention measures. In some examples, the remedial action may be targeted or tailored to the specific instance, type, identifier, hash, family, and/or cluster of malware or other security threat predicted to attack the corresponding target.

In some examples, the remedial action may include updating a security product definition or signature set to include a definition or signature for the predicted security threat attack, thereby enabling a corresponding security product to identify and neutralize the predicted attack. Similarly, the remedial action may include updating a security program set of scripts for removing, uninstalling, and/or otherwise neutralizing or inhibiting corresponding security threat attacks. Other examples of the remedial action may also include targeted employee training, assigning a security risk score to the target, selective system hardening, and/or customized honey traps.

As explained above in connection with method 300 in FIG. 3, the disclosed systems and methods may enable and/or improve the prediction of security threat attacks by newly applying one or more algorithms to historical attack data that describes histories of attacks on various security targets, such as enterprise organizations. For example, the disclosed systems and methods may apply a collaborative filtering algorithm to improve predictions of security threat attacks, thereby enabling predicted targets to take preventive action prior to the attacks occurring.

Figure 5:
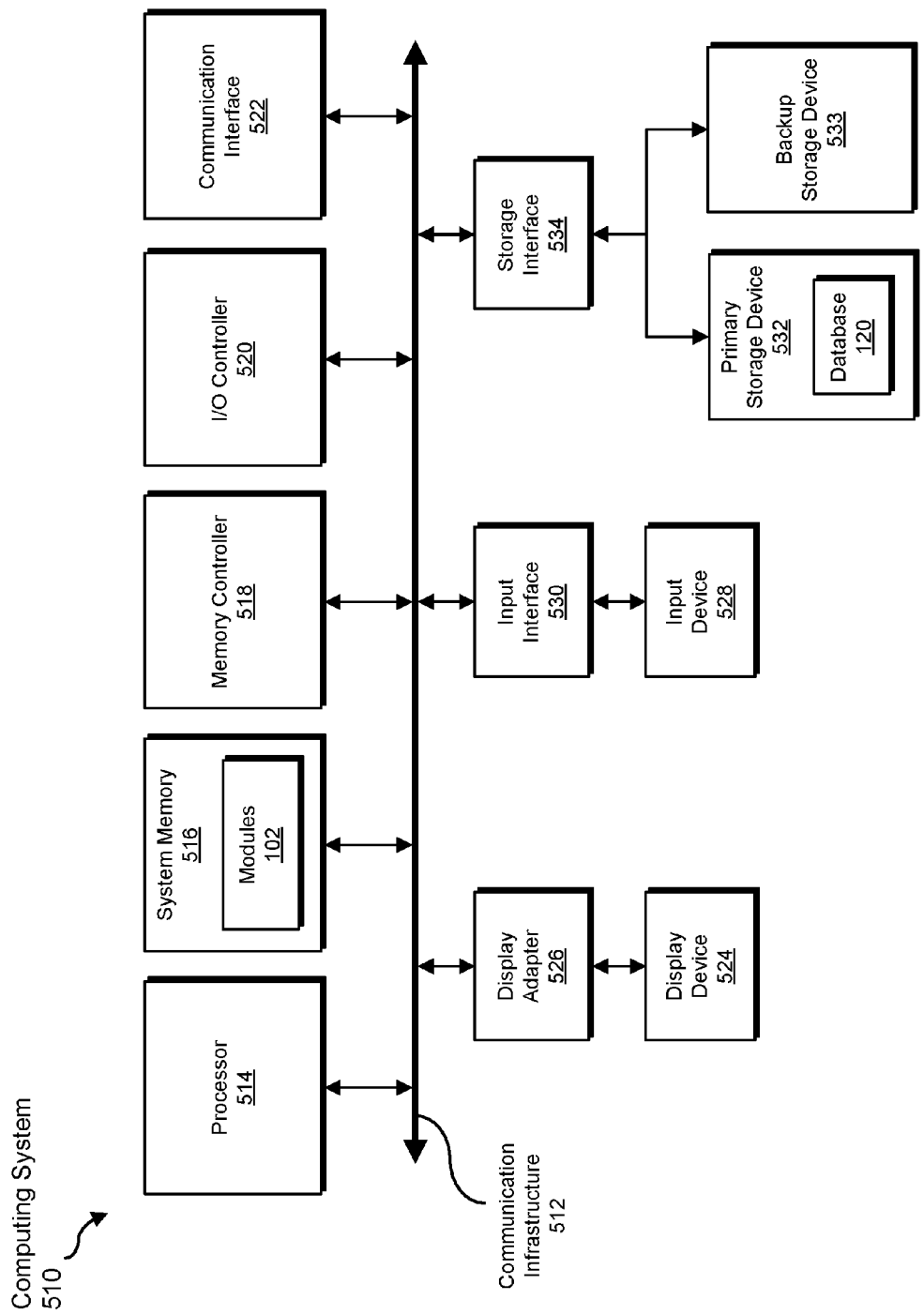
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
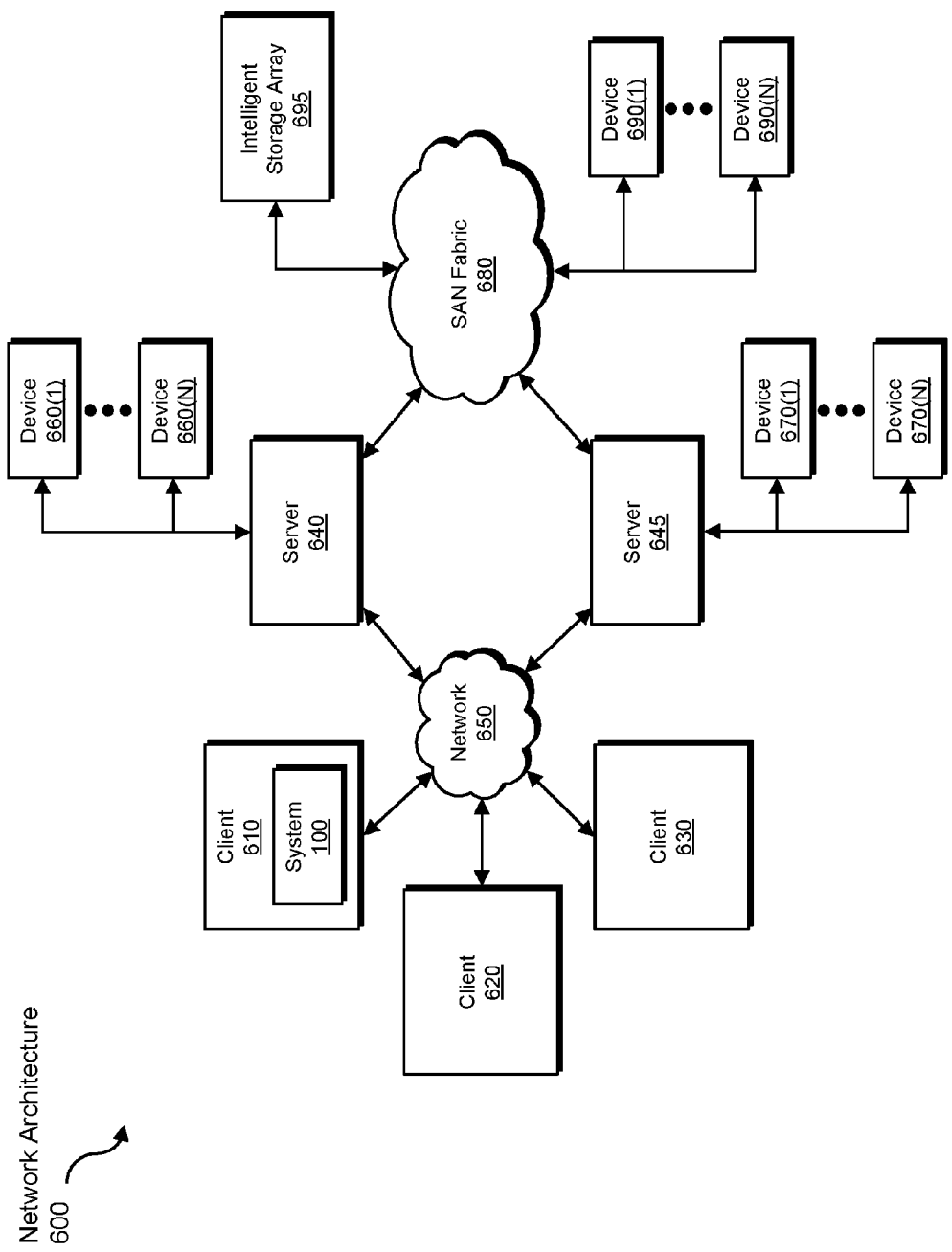
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for predicting security threat attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for predicting security threat attacks, at least a portion of the method being performed by a computing device comprising at least one processor, the method comprising:
    identifying candidate security threat targets with latent attributes that describe features of the candidate security threat targets;
    identifying historical attack data that describes which of the candidate security threat targets experienced an actual security threat attack;
    determining, by a software security prediction program, a similarity relationship between latent attributes of at least one specific candidate security threat target and latent attributes of the candidate security threat targets that experienced the actual security threat attack according to the historical attack data by analyzing a matrix that indicates that the actual security threat attack targeted the candidate security threat targets by populating a respective entry of the matrix at each intersection between a vector of the matrix that corresponds to the actual security threat attack and each vector of the matrix that corresponds to the candidate security threat targets that experienced the actual security threat attack;
    predicting by the software security prediction program based on the determined similarity relationship, that the specific candidate security threat target will experience a future security threat attack; and performing, by the software security prediction program, at least one remedial action to protect the specific candidate security threat target in response to predicting the future security threat attack, wherein the candidate security threat targets comprise enterprise organizations that include customers of a vendor of the software security prediction program.

2. The method of claim 1, wherein the actual security threat attack comprises a malware attack.

3. The method of claim 1, wherein determining the similarity relationship comprises:
identifying an additional candidate security threat target that experienced a pair of actual security threat attacks; and
determining that the specific candidate security threat target experienced one of the pair of actual security threat attacks.

4. The method of claim 3, wherein predicting that the specific candidate security threat target will experience the future security threat attack comprises predicting that the specific candidate security threat target will experience the other of the pair of actual security threat attacks.

5. The method of claim 1, wherein determining the similarity relationship comprises:
identifying an additional candidate security threat target that stored a cluster of benign files and that experienced a same security threat attack as the predicted future security threat attack; and
determining that the specific candidate security threat target also stored the cluster of benign files.

6. The method of claim 1, wherein the matrix identifies:
the enterprise organizations as corresponding to one of rows and columns of the matrix; and
security threat attacks corresponding to the other of the rows and columns of the matrix.

7. The method of claim 6, wherein the matrix comprises a sparse matrix.

8. The method of claim 6, wherein determining the similarity relationship comprises performing a rank factorization of the matrix.

9. The method of claim 8, wherein performing the rank factorization of the matrix comprises executing a stochastic gradient descent algorithm.

10. The method of claim 1, wherein:
determining the similarity relationship comprises:
ranking candidate security threat targets in terms of counts of experiencing actual security threat attacks; and
ranking security threat attacks in terms of actually attacking enterprise organizations; and
predicting that the specific candidate security threat target will experience the future security threat attack is based on the rank of the specific candidate security threat target and the rank of the predicted future security threat attack.

11. A system for predicting security threat attacks, the system comprising:
an identification module, stored in memory, that:
identifies candidate security threat targets with latent attributes that describe features of the candidate security threat targets; and
identifies historical attack data that describes which of the candidate security threat targets experienced an actual security threat attack;

a determination module, stored in memory, that determines, as part of a software security prediction program, similarity relationship between latent attributes of at least one specific candidate security threat target and latent attributes of the candidate security threat targets that experienced the actual security threat attack according to the historical attack data by analyzing a matrix that indicates that the actual security threat attack targeted the candidate security threat targets by populating a respective entry of the matrix at each intersection between a vector of the matrix that corresponds to the actual security threat attack and each vector of the matrix that corresponds to the candidate security threat targets that experienced the actual security threat attack;

a prediction module, stored in memory, that predicts, as part of the software security prediction program based on the determined similarity relationship, that the specific candidate security threat target will experience a future security threat attack;

a performance module, stored in memory, that performs, as part of the software security prediction program, at least one remedial action to protect the specific candidate security threat target in response to predicting the future security threat attack, wherein the candidate security threat targets comprise enterprise organizations that include customers of a vendor of the software security prediction program; and at least one physical processor configured to execute the identification module, the determination module, the prediction module, and the performance module.

12. The system of claim 11, wherein the actual security threat attack comprises a malware attack.

13. The system of claim 12, wherein the determination module determines the similarity relationship by:
identifying an additional candidate security threat target that experienced a pair of actual security threat attacks; and
determining that the specific candidate security threat target experienced one of the pair of actual security threat attacks.

14. The system of claim 13, wherein
the prediction module predicts that the specific candidate security threat target will experience the future security threat attack by predicting that the specific candidate security threat target will experience the other of the pair of actual security threat attacks.

15. The system of claim 11, wherein the determination module determines the similarity relationship by:
identifying an additional candidate security threat target that stored a cluster of benign files and that experienced a same security threat attack as the predicted future security threat attack; and
determining that the specific candidate security threat target also stored the cluster of benign files.

16. The system of claim 11, wherein the matrix identifies:
the enterprise organizations as corresponding to one of rows and columns of the matrix; and
security threat attacks corresponding to the other of the rows and columns of the matrix.

17. The system of claim 16, wherein the matrix comprises a sparse matrix.

18. The system of claim 16, wherein the determination module determines the similarity relationship by performing a rank factorization of the matrix.

19. The system of claim 18, wherein the determination module performs the rank factorization of the matrix by executing a stochastic gradient descent algorithm.

20. A non-transitory computer-readable medium comprising one or more computer-readable instructions that, when executed by at least one processor of a computing device, cause the computing device to:
- identify candidate security threat targets with latent attributes that describe features of the candidate security threat targets;
- identify historical attack data that describes which of the candidate security threat targets experienced an actual security threat attack;
- determine, by a software security prediction program, a similarity relationship between latent attributes of at least one specific candidate security threat target and latent attributes of the candidate security threat targets that experienced the actual security threat attack according to the historical attack data by analyzing a matrix that indicates that the actual security threat attack targeted the candidate security threat targets by populating a respective entry of the matrix at each intersection between a vector of the matrix that corresponds to the actual security threat attack and each vector of the matrix that corresponds to the candidate security threat targets that experienced the actual security threat attack;
- predict, by the software security prediction program based on the determined similarity relationship, that the specific candidate security threat target will experience a future security threat attack; and
- perform, by the software security prediction program, at least one remedial action to protect the specific candidate security threat target in response to predicting the future security threat attack, wherein the candidate security threat targets comprise enterprise organizations that include customers of a vendor of the software security prediction program.

\* \* \* \* \*